Sept. 6, 1966 L. V. BALDWIN 3,271,642
ELECTRICAL CAPACITORS
Filed Nov. 4, 1965
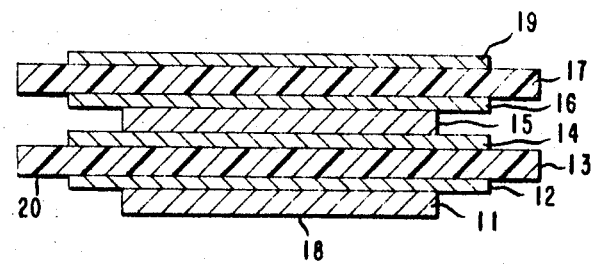
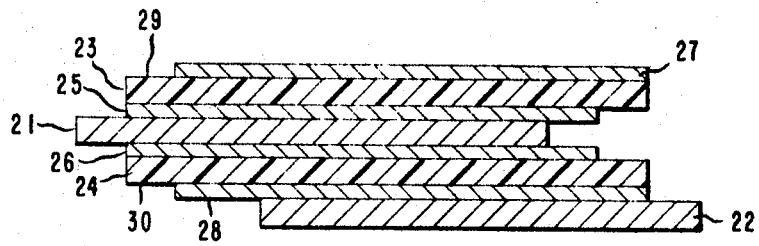
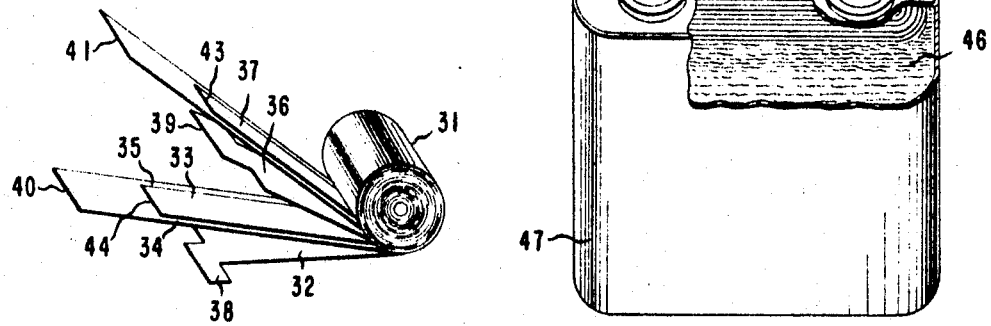
INVENTOR
LOUIS VINCENT BALDWIN
BY *A. Ralph Snyder*
ATTORNEY

United States Patent Office 3,271,642
Patented Sept. 6, 1966

3,271,642
ELECTRICAL CAPACITORS
Louis Vincent Baldwin, Hockessin, Del., assignor to E. I. du Pont de Nemours and Company, Wilmington, Del., a corporation of Delaware
Filed Nov. 4, 1965, Ser. No. 513,629
3 Claims. (Cl. 317—260)

This application is a continuation-in-part of my copending application Serial No. 329,454, filed December 10, 1963, now abandoned which in turn is a continuation-in-part of my copending application Serial No. 187,410, filed April 13, 1962, now abandoned.

This invention relates to electrical capacitors, and, more particularly, to capacitors utilizing dielectric sheets metallized on both sides in combination with interwound metal foil conductors which are adapted for use in power handling applications.

A principal object of this invention is to provide a capacitor with an increased serviceable life in uses for which power handling is important. Other objectives will appear hereinafter.

Corona breakdown seriously limits the lifetime of previously known capacitors for power handling applications such as power factor correction. These capacitors, which consist of at least two strips of metal foil separated by insulating strips of dielectric, such as paper or films of synthetic organic polymers, have the entire assembly immersed in a dielectric oil to minimize corona and breakdown. In spite of employment of capacitors at voltages substantially below the known value of corona onset, failures occur after as little as a few hundred hours. Evidence indicates that dielectric breakdown is initiated in the oil by a process which is caused by voltage surges incidental to opening and closing switches in the circuit. Breakdown is predominantly at points of high potential gradient which occur at irregularities in the spacing of the metal foil and the dielectric sheet and along the edges of the foil. Means are required to provide a uniform potential over the entire dielectric and avoid point sources of potential gradient.

Capacitors, now used where power handling capacity is not important, which employ films metallized on both sides instead of the foil and uncoated film combination are not suitable for such uses as power factor correction. The resistivity of economically feasible thicknesses of metal coatings is so great as to cause electrical heating, which speeds the onset of corona and dielectric breakdown.

In the present invention good electrical conductivity is provided by conventional metal foils which are interwound with dielectric sheets which are metal coated on both surfaces, the width of the coating being greater than the width of the metal foil whereby the coating extends beyond the edges of the foil in contact therewith. The resulting structure insures that in operation there will be a uniform potential over the entire dielectric surface except for the required margins at the edges of the dielectric sheets where the foil is not in contact with the dielectric sheets. The metal coating need have a thickness only sufficient to provide a continuous electrical conductor. With this structure even random contact between the metal coating and the metal foil electrode will provide a uniform potential across the entire area of the dielectric as described above.

For a more clear understanding of this invention and its advantages, reference is made to the accompanying drawings wherein:

FIG. 1 is a schematic cross-sectional illustration of the arrangement of separate elements of this invention.

FIG. 2 schematically represents a preferred relationship of the separate elements of this invention.

FIG. 3 illustrates the foil and dielectric members of this invention wound in a form to be used in a capacitor.

FIG. 4 illustrates a preferred application of the present invention, namely, as a power handling capacitor wherein the interwound dielectric and metal foil components of the capacitor are immersed in a dielectric liquid. Parts are broken away to show the interior elements of the capacitor.

As shown in FIG. 1, the arrangement known as the tab construction, the basic combination of metal foil and dielectric sheet or film which is metallized on both sides form a laminar structure. One surface of the metal foil 11, contacts metal coating 12 of film 13; the metal coating 14 of the opposite face of film 13 contacts the second metal foil 15. Contacting the opposite surface of foil 15 is metal coating 16 of a second metallized film 17. The metal coating in each instance is wider than the foil in contact therewith and thus extends for a short distance, e.g., ⅛ inch, beyond each edge of the foil. Each of these lamina extend for the desired length in a direction perpendicular to the plane of the paper, and are spirally wound on an axis parallel to the plane of the paper. Upon winding into a spiral, surface 18 of the metal foil 11 contacts metal coating 19 of film 17, and thus repetitively for as many convolutions as are required to provide the desired capacity in the capacitor. Foil 11 and foil 15 are electrically coupled by means (not shown) to an external circuit. Although foil 11 and foil 15 are the basic current-carrying elements of the capacitor, it is to be understood that in operation of the capacitor electric charges may be distributed over the aforementioned metal coatings on the film dielectrics.

In order to prevent corona discharges around the edges of the film it is essential to have uncoated margins 20 on films wherein the opposite surfaces are at different potential. This is accomplished by masking the film during the coating operation, which preferably is deposited by evaporation in a vacuum, or by etching or buffing a fully coated film to remove undesired metal. Moreover, it is essential that the metal coating extend beyond the lateral (side) edges of the area of metal foil in contact therewith to prevent voids at the edges of the foil which would result in points of high potential gradient and incipient breakdown thereby nullifying to a large extent the advantage derived from the coating.

An arrangement of elements of a capacitor of the extended foil construction, as is known in the art, is illustrated in FIG. 2. In this construction the separate electrodes, metal foil 21 and metal foil 22, are staggered in the laminate. This arrangement facilitates electrical connections to the foil electrodes, but requires a slightly different disposition of the metal coatings on the surfaces of the sheet or film dielectric. Foil 21 extends beyond the edges of metallized films 23 and 24. Metal coatings 25 and 26 of the respective films extend to the edges of the film adjacent the foil, with the coatings 27 and 28 on the opposite sides of the films recessed to provide uncoated margins 29 and 30 to prevent corona around the edges of the film. The reverse arrangement is used on the opposite edges of the elements so that foil 22 is extended. Coating 27 contacts foil 22 upon formation of a convolute coil with its axis parallel to the plane of the paper in a manner analogous to that described in FIG. 1.

Convolutely wound elements of a tab-type capacitor constructed according to this invention are illustrated in FIG. 3. The ends of the lamina are shown fanned out to expose details of the structure. Roll 31 is formed from the four lamina, in order, foil 32, film 33, which is metallized on both sides, with margins 34 and 35 left uncoated; coil 36 is followed by dielectric sheet 37 which is similar to dielectric sheet 33. Connecting tabs 38 and 39, on foils 32 and 36, respectively, are conveniently formed by partially cutting through the foil from an edge and folding it over to project from the opposite edge for connections to an external circuit. Tabs 38 and 39 are shown on opposite edges of the respective foils, but it is understood that these may be on edges on the same end of roll 31 if adequate precautions are taken to insulate one from the other. Likewise, tabs are shown on the end of the roll only, but these may be placed along the roll either by cutting the foil and folding over, or by insertion of metal tabs in the roll as it is formed. The former method is preferred, however, since it provides superior connection and less likelihood of arc formation.

In addition to having no metallized coating on the margins of the dielectric members, as shown in FIG. 3, the metal coating is removed from both sides along lines 43 and 44 of each dielectric just beyond the end of the foil. Uncoated tails 40 and 41 are retained to wrap around roll 31 at least once to provide additional insulation from the exterior. Metal foil strips 32 and 36 are slightly narrower than adjacent metal coatings on the dielectric sheets, as illustrated in FIG. 1.

As shown in FIG. 4, for application in power handling capacitors, the interwound metal-coated dielectric and metal foil elements of the capacitor, indicated collectively by the reference numeral 45 are immersed in a liquid dielectric oil 46, or its equivalent, contained in a suitable sealed casing 47 carrying terminal lugs 48 and 49 connected interiorly to the alternate foil elements of the capacitor as will be readily understood by those skilled in the art.

The preferred material for the dielectric sheets in this invention is polyethylene terephthalate, since it has generally superior electrical properties. Films of other polyesters, for example polycarbonates, are useful, however, as are other synthetic polymer films such as the polyolefins, fluorinated polymers, and the like, as well as paper.

Aluminum is conveniently used for metallizing the film, but other metals such as copper and zinc are also useful.

This invention is most useful in power factor capacitors, which employ dielectric liquids, but it is also useful in capacitors which are filled with gases, such as the so-called electronegative gases as are known to the art. The maximum allowable voltages are somewhat reduced, of course, in capacitors employing gaseous instead of liquid dielectrics.

The following examples will further serve to illustrate the principles and practice of this invention.

*Example 1*

Several capacitors were constructed in accordance with the foregoing description, with dielectric sheets of 2-inch wide, 2 mil "Mylar"[1] coated with aluminum of about 0.001 mil thickness (resistance of 1 ohm per square) on each side. The metal coating was applied to a strip of 1¾ inches in width on each surface by masking a ⅛-inch margin on each edge of the film during deposition of the metal in a vacuum chamber. Two strips of 0.25 mil aluminum foil 1½ inches in width were interwound with two strips of the metallized film. Tabs were inserted at the outer ends of the foil and coupled to an external electrical circuit. The entire laminar roll was immersed in a dielectric mineral oil and held under reduced pressure for a short period to facilitate penetration of the oil into interstitial voids.

Also constructed were capacitors of the conventional type, identical in all respects except that uncoated film instead of metallized film was used.

The two types of capacitors were compared on a 60-cycle alternating current circuit with provision for a voltage continuously variable to 4800 volts (R.M.S.). An electrostatic voltmeter (0–5000 volts; made by Rawson Electrical Instruments Co.) enabled measurement of the continuously applied voltage. Coupled to this source were a plurality of branch circuits, each fused with ¼ amp. cartridge fuses. Failure of a capacitor was indicated by a blown fuse in the individual circuit. The capacitors under test had a capacity of 0.03 microfarad, and by gradually raising the voltage, all were found to have an inherent corona starting voltage of approximately 2400 volts (as determined with an Addison corona discharge detector type Hivolt AC-2).

Under test, capacitors of each type described in this example were simultaneously stressed at 2000 volts A.C. by throwing an on-off switch. Impulses under these conditions with the transformers and inductive elements in the circuit previously had been found to reach values of approximately 4000 volts. The power, which was applied continuously, was momentarily switched off and on three times daily, at which time the fuses were inspected for capacitor failure. The conventional capacitors utilizing the uncoated film all failed during the period ranging from 16 to 300 hours, while most of the capacitors with the metallized film in combination with the foil were operating a period of time extending to 7200 hours.

A further test was conducted to demonstrate the criticality of having the foil element of the capacitor slightly narrower than the metal coating on the film dielectric.

*Example 2*

In a capacitor having foil extending at points as much as ⅛ inch beyond the edge of the metal coating, which is a practical difficulty encountered in attempting to wind capacitors in which the foil and coating are of the same nominal width, failure was encountered in as soon as five days as a result of corona along the edges, while capacitors with foil ⅛ inch narrower than the metal coating in contact therewith have operated for over two years without failure. The only failures occurring in this period with the latter structure resulted from obvious marring and scratching of the metallized coating.

*Example 3*

To further demonstrate the critical advantage of a capacitor structure having the metal foil recessed from the edge of the metal coating on a two-side metal coated dielectric film in comparison with the structure having foil co-extensive with the metal coating, tests were conducted with single flat sheet dielectric layer devices with apparatus to compare the corona resistance of various structures. In these tests, flat 2 x 2 inch sheets of two-side aluminum coated 2-mil polyester film, "Mylar"[1], having a ¼-inch unmetallized border surrounding the metal, were placed between sheets of aluminum foil and clamped in a jig with metal electrodes to allow a voltage to be impressed across the dielectric between the metal coatings. In the first set of tests the foil was carefully cut and fitted so as to be precisely co-extensive with the metal coating; particular care was used to see that the foil at no point extended beyond the metal coating. In a second set of tests similar care was used to cut and fit the foil precisely ⅛ inch smaller than the metal coating. Each flat sheet capacitor thus constructed in the two sets of tests was immersed in a standard dielectric oil and was pulsed at 2400 volts, 60 cycles, A.C. R.M.S.; in the first tests, with the co-extensive metal-film and foil, corona occurred after at most, 3 pulses, usually with the first pulse. In the second set of tests, with recessed foil, corona occurred only after 15–20 pulses. Corona was detected with an Addison corona discharge detector, type Hivolt AC-2.

In addition to the longer lifetime experienced with the capacitors of the present invention in power applications, these capacitors possess advantages over regular metallized film capacitors for other uses. Principally, the ease of attachment of the electrode to external circuits is greater.

---

[1] Du Pont's trademark for its polyester film.

[1] Du Pont trademark.

Many widely different embodiments of this invention, without departing from the spirit, will be apparent to one skilled in the art. It is to be understood, however, that the invention is not limited except as defined in the appended claims.

I claim:
1. An electrical capacitor comprising a convolutely wound laminar structure comprising at least two strips of a metal foil and at least two strips of a sheet dielectric, said foil strips and said dielectric strips being arranged respectively in alternate layers, said dielectric strips having deposited on both sides thereof a layer of metal, said layers of metal being adjacent and in electrical contact with said foil strips and extending beyond the lateral edges of said foil strips, said foil strips having means to couple each respectively to an external electrical circuit, said laminar structure being immersed in a dielectric material contained in a casing adapted to envelope said laminar structure.

2. An electrical capacitor as set forth in claim 1 wherein said dielectric material is a dielectric liquid.

3. An electrical capacitor as set forth in claim 1 wherein said dielectric material is a gas.

References Cited by the Examiner
UNITED STATES PATENTS

| | | | |
|---|---|---|---|
| 971,667 | 10/1910 | Dean | 317—260 |
| 1,829,891 | 11/1931 | Dublier | 317—261 |

LEWIS H. MYERS, *Primary Examiner.*

E. GOLDBERG, *Assistant Examiner.*